UNITED STATES PATENT OFFICE 2,411,942

CHEMICAL PROCESSES

Lee Irvin Smith, Minneapolis, Minn., and Herbert E. Ungnade, Columbia, Mo., assignors to Regents of the University of Minnesota, Minneapolis, Minn., a corporation of Minnesota No Drawing. Application January 10, 1942, Serial No. 426,324

10 Claims. (Cl. 260—333)

This invention relates to new organic chemical compositions and compounds and to methods of producing the same. More particularly the present invention relates to compounds of the coumaran and chroman types, mixtures including such compounds and to methods of producing the compounds and mixtures from available ingredients notably hydroquinone compounds and compounds presenting the conjugated diene structure, or hydroquinone compounds and certain eneols (alcohols).

We have found that when an ingredient including a hydroquinone compound having vacant at least one position ortho to the hydroxyl group is reacted with an ingredient presenting the conjugated diene structure, or with certain mixtures of the latter, that new products are produced which are useful as antioxidants, biological control factors, medicinal agents and for other purposes, and it is an object of the present invention to provide such products and to provide the method of manufacture therefor.

Thus when compounds of the conjugated diene type are reacted with hydroquinone compounds such as hydroquinone derivatives or substituted hydroquinones, for example the hydroquinone monoethers, all having vacant at least one position ortho to the hydroxyl group, chroman or coumaran compounds are produced and it is accordingly an object of the invention to provide such a method of manufacture. The "hydroquinone compound" referred to herein may also be designated as alkyl substituted para-di-hydroxy-benzenes and their mono ethers and mono esters.

Where the hydroquinone ingredient is a compound of the substituted type, the substitution group or groups may be permitted to remain in place during the reaction with the diene or eneol ingredient, and then, if desired, the substitution group or groups may be cleaved from the resultant product structures, and it is therefore an object of the present invention to provide such methods of producing the new products hereof.

The diene reaction material utilized in our invention may be derived by simple reactions from alcohols and we have made the further discovery that if desired the production of such diene materials may be caused to take place simultaneously in the reaction in which it is used, along with the hydroquinone compound, in the production of the new products of this invention. It is therefore a further object to provide these useful methods for producing the products of this invention.

It is to be understood, of course, that under some conditions of operation the hydroquinone compound ingredient may be combined directly with the eneol (alcohol) ingredient to produce the desired product without first converting them to the diene type compositions and it is accordingly an object of the present invention to provide such a method of manufacture.

It is a further object of the invention to utilize any exhibited effect of the herein described processes and/or products and to utilize such processes and/or products in any of their known or hereinafter discovered capacities.

Other and further objects are those inherent and implied by the processes and products hereinafter described and claimed.

According to one of the methods of the present invention dienes or compounds presenting the conjugated diene linkage, such as 2,3-dimethyl butadiene-1,3; isoprene or phytadiene may be reacted with hydroquinone compounds such as hydroquinone derivatives, substituted hydroquinones, hydroquinone monoethers or the like, all having vacant at least one position ortho to the hydroxyl group to produce the new products of the present invention. The reaction is preferably carried out in the presence of an acid catalyst which may be an organic acid such as formic acid, or acetic acid; acid chlorides, or anhydrides such as acetyl chloride or acetic anhydride; a substituted organic acid such as halogenated acetic acid, inorganic acids such as sulphuric or phosphoric, or their anhydrides, such as phosphorus pentoxide, or acidic inorganic compounds such as the amine salts, aluminum chloride, zinc chloride, mercuric chloride, phosphorus oxychloride acid sulfates, or boron trifluoride.

The method utilizing dienes as one of the starting ingredients is claimed in our Patent No. 2,249,054 which issued July 15, 1941, on our parent application Ser. No. 211,077, to which reference is here made. Specific examples illustrating the use of dienes as starting materials have therefore not been included in the present specification.

The diene constituents for the procedures herein described may be produced from the corresponding alcohol either as a preliminary reaction or in situ in the reaction medium wherein the hydroquinone compound is present. Where produced in situ the hydroquinone ingredient in effect reacts with the alcohol ingredient, the diene intermediate, if produced, being transient. Some evidences indicate that with certain alcohols, at least, the reaction does not not include the formation of a diene intermediate, and that the reaction is directly between the hydroquinone compound ingredient and the alcohol ingredient.

The compounds which are adaptable for use in the present invention in the place of the dienes aforementioned are those presenting double bond linkages. Thus any alcohol, such as an allylic alcohol, or any compound which will produce a diene constituent either directly by the use of acid catalysts and/or heat, or after rearrangement in the presence of acids and/or by heating, may be used in this synthesis. Thus for the source of the diene constituent we may use an ene-ol, e. g. an aliphatic alcohol in which at least one double bond is present, such as primary allylic alcohols having the general structure

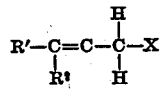

where R' or R² are hydrogen atoms or alkyl radicals of which phytol, geraniol and allyl alcohols are examples, or there may be used tertiary allylic alcohols having the general structure

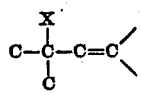

in which X may be either a hydroxyl group or a halogen of which isophytol, etc., are examples. It will be recognized that these tertiary alcohols may be designated as alpha, alpha allylic alcohols having the double bond in the beta-gamma position. Methyl vinyl carbinol and ethyl vinyl carbinol may also be used. Or as the source of the diene constituent we may likewise use a dihydric alcohol or a halide such as the 1,2 diols or 1,2 dihalides having the general structure

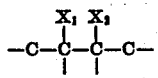

or the 1,3 diols or 1,3 dihalides having the general structure

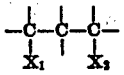

where either X₁ or X₂ or both may be a hydroxyl group or halogen.

When utilizing the dihalides according to this procedure the selected diene yielding compound is substituted for the diene constituent and the reaction carried out as before in the presence of an acid dehydrating catalyst or by heating in the absence of a catalyst. When utilizing the diols it is preferred to prepare the conjugated diene constituent and utilize the thus prepared diene constituent with the hydroquinone compound in producing the new products of the present invention.

The examples hereinafter given are illustrative of the invention when the iso-type alcohols are used as the enol starting ingredient. Illustrations of the invention when using primary-type alcohol as the enol starting ingredient are given in our copending application Ser. No. 284,457 which is a continuation-in-part of Ser. No. 211,077 (now Patent 2,249,054) and parent of the instant application.

*Example I*

A mixture of 1 gram trimethylhydroquinone, 1 cc. methylvinyl carbinol (which is the allylic isomer of crotyl alcohol) 0.3 gram zinc chloride and 5 cc. benzene was sealed in a Carius tube and heated to 200° C. for 3 hours. The product was dissolved out with petroleum ether and the solution was allowed to stand for 24 hours. It was then filtered and evaporated and the residue was crystallized from petroleum ether and then from aqueous ethanol. The thus purified product melted at 119.5 to 120.5° C. and was believed to be 2,3,4,6,7-pentamethyl-5-hydroxy coumaran.

*Example II*

2 grams of trimethylhydroquinone, 2 cc. ethylvinyl carbinol (which is the allylic isomer of pentene 2-ol-1 having the formula

0.6 gram zinc chloride and 5 cc. benzene were sealed in a Carius tube and heated to 150° C. for one hour and then to 200° C. for one hour. The benzene layer of the reaction mixture was separated, washed with water and then steam distilled. The benzene fraction resulting from the steam distillation was discarded and subsequent aqueous distillates containing the reaction product retained. A solid crystallized out of the aqueous fraction and was filtered off with suction and re-crystallized several times from petroleum ether. The thus purified product had a melting point of 88–89° C. and is believed to be 2,4,6,7-tetramethyl 3 ethyl-5 hydroxy coumaran. The results of this procedure indicate that the particular alcohol used may react directly with the hydroquinone compound without first producing the diene.

*Example III*

A mixture of 800 cc. glacial acetic acid, 100 grams zinc chloride, 200 grams trimethylhydroquinone was heated with stirring at 125–130° C. in an atmosphere of nitrogen. Into the hot mixture there was dropped 400 grams of isophytol. After three hours of heating, the resultant reaction mixture was poured into a mixture of ice and water and the mass was extracted with ethyl ether. The ether layer was washed with water and dilute potassium hydroxide and dried over sodium sulphate. The ether was then distilled off and the residue further purified by distillation in high vacuum.

The product produced in accordance with the present example is the same if phytol is substituted for isophytol and is a pale yellow fairly viscous oil and when biologically assayed for its vitamin E activity was found to be 100% active in 3 mg. doses. That is to say, when the product of this example was fed in single 3 mg. doses to standardized conditioned female tests rats, litters of live young were produced in 100% of all rats fed, and the activity of the product was equal, weight for weight, to natural alpha tocopherol.

However, the product of the present example is not identical with natural alpha tocopherol since the former is racemic (non-rotatory) about the number two carbon atom, while the latter is rotatory about the same. The new product of this procedure may thus, with reason be known as racemic alpha tocopherol.

The non-identity is also evidenced by the fact that the allophanate derivatives of the product produced by this example and the allophanate derivatives of natural alpha-tocopherol melt at 168–170° C. and 157–160° C. respectively, and the melting point of mixtures of allophanate derivatives is between these melting points.

In the present example the glacial acetic acid, a polar solvent, apparently acts not only as a solvent but also as a catalyst. Other examples of polar solvents suitable for use in the reactions of the present invention are formic acid, propionic acid and the like compounds.

Example IV

When nerolidol, which is described by Beilstein, vol. I, page 464 and otherwise known as the allylic isomer of tetrahydrofarnesol, having the structure

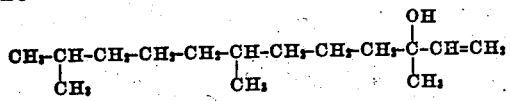

is substituted for the dienes of any of the foregoing examples, it is probably converted into a diene which immediately reacts with the hydroquinone compound to produce a chroman. It will readily be recognized that the allylic isomer of tetrahydrofarnesol is an alpha-alpha allylic alcohol with the double bond in the beta-gamma position. As an example of this procedure the following is given: Trimethyl hydroquinone (1 g.) and nerolidol (5 g.) are dissolved in a mixture of formic acid (5 g.) and acetic acid (5 g.) and the solution refluxed for three hours. The product (2 g.) is isolated and is a dark, viscous oil.

Similar esters may be prepared from any of the products produced in accordance with the procedure herein set forth provided these products contain a free hydroxyl group. The propionate, butyrate, palmitate, stearate and the like esters may also be prepared from the products hereof and are particularly useful where stability is important.

In the procedures herein described, the hydroquinones compound ingredient may, if desired, be a mono-ether such as the methyl, ethyl, propyl, allyl, cyclohexyl or the like or a mono-ester, such as an acetate, propionate, benzoate, allophanate, palmitate or the like, which ethers or esters have at least one position vacant ortho to a free hydroxy group of the hydroquinone nucleus. The ether or ester grouping remains throughout the reaction and, if desired, is cleaved from the resulting product by any of the well known methods as for example by hydrolysis for the ester and by the use of a Grignard reagent for the ethers. As further examples of the manner of cleaving the ester or ether groups to re-introduce the hydroxy groups, this may be accomplished in the case of ethers, by hydrolysis using hydrobromic acid (40%) and hydrogen bromide in acetic acid, and in the case of the esters, by hydrolysis with dilute alkalies. It is to be understood of course, that for some uses, it is desirable to leave the ether or ester grouping in place, while for other uses it is desirably removed.

In each of the foregoing examples the hydroquinone compound used is either a substituted hydroquinone or a derivative of hydroquinone. Accordingly, where the term "hydroquinone compound" is used in the specification and claims, it is intended to mean alkyl substituted hydroquinones or the hydroquinone ethers and esters such as those herein enumerated.

Certain of the products containing a free hydroxyl group, and made according to the process of the present inventiton, are active antioxidants and may be used for the purposes for which antioxidants have heretofore been employed, and being structurally identified with the tocopherols, they are useful as such. The term "tocopherols" refers to naturally occurring substances having biological (vitamin E) activity. The term was introduced into the literature in the Journal of Biological Chemistry, volume 113, page 321, 1936.

The present application is a continuation-in-part of our application Serial No. 284,457, filed July 14, 1939.

Many and various modifications will suggest themselves to those skilled in the art and it is intended that these may be used in modification of the procedures and products herein set forth without departing from the spirit of the invention described and claimed.

We claim as our invention:

1. A process for producing chroman compounds comprising reacting a substituted allylic alcohol having a double bond in the beta-gamma position in respect to the hydroxyl group and at least one alkyl group in the alpha position, with an aromatic compound containing a free hydroxyl group and an unsubstituted position ortho to said hydroxy and selected from the group consisting of alkyl-substituted-para-di-hydroxy-benzenes and their mono-ethers and mono-esters, in the presence of an acidic substance.

2. A process for producing chroman compounds comprising reacting an alpha-alpha-di-alkyl substituted allylic alcohol having a double bond in the beta-gamma position to the hydroxyl group, with an aromatic compound containing a free hydroxyl group and an unsubstituted position ortho to said hydroxyl and selected from the group consisting of alkyl-substituted-para-di-hydroxy-benzenes and their mono-ethers and mono-esters, in the presence of an acidic substance.

3. A process for producing chroman compounds comprising reacting an alpha-alpha-di-alkyl substituted allylic alcohol having a double bond in the beta-gamma position to the hydroxyl group, with an aromatic compound containing a free hydroxyl group and an unsubstituted position ortho to said hydroxyl and selected from the group consisting of alkyl-substituted-para-di-hydroxy benzenes and their mono-ethers and mono-esters, said reaction being carried out at superatmospheric pressure and in the presence of an acid catalyst.

4. A process for producing chroman compounds comprising reacting an alpha-alpha-di-alkyl substituted allylic alcohol having a double bond in the beta-gamma position to the hydroxyl group, with an aromatic compound containing a free hydroxyl group and an unsubstituted position ortho to said hydroxyl and selected from the group consisting of alkyl-substituted-para-di-hydroxy-benzenes and their mono-ethers and mono-esters, said reaction being carried out in the presence of a solvent and in the presence of an acidic catalyst.

5. A process for producing chroman compounds comprising reacting an alpha-alhpa-di-alkyl substituted allylic alcohol having a double bond in the beta-gamma position to the hydroxyl group, with an aromatic compound containing a free hydroxyl group and an unsubstituted position ortho to said hydroxyl and selected from the group consisting of alkyl-substituted-para-di-hydroxy-benzenes and their mono-ethers and mono-esters, said reaction being carried out in the presence of zinc chloride.

6. A process for producing chroman compounds which comprises reacting an alpha-alpha-di-alkyl-substituted allylic alcohol having a double bond in the beta-gamma position to the hydroxyl group and a mono-ester of an alkyl substituted para-di-hydroxy benzene having one position vacant ortho to the free hydroxyl group, in the presence of an acidic substance, and then cleaving the ester group from the reaction product to reintroduce the hydroxyl group.

7. A process for producing chroman compounds which comprises reacting an alpha-alpha-di-alkyl-substituted allylic alcohol having a double bond in the beta-gamma position to the hydroxyl group and a mono-ether of an alkyl substituted para-di-hydroxy benzene having one position vacant ortho to the free hydroxyl group, in the presence of an acidic substance, and then cleaving the ether group from the reaction product to reintroduce the hydroxyl group.

8. A process for producing chromans comprising reacting an alpha-alpha-di-alkyl substituted allylic alcohol having a double bond in the beta-gamma position to the hydroxyl group, with an alkyl-substituted, para dihydroxy benzene having an unsubstituted position ortho to said hydroxyl under acidic conditions.

9. The process of claim 8 and in which the reaction is conducted in the presence of formic acid.

10. The process of claim 8 and in which the reaction is conducted in the presence of zinc chloride.

LEE IRVIN SMITH.
HERBERT E. UNGNADE.